(12) United States Patent
Perfors et al.

(10) Patent No.: US 11,851,107 B2
(45) Date of Patent: Dec. 26, 2023

(54) VEHICLE ROOF ASSEMBLY

(71) Applicant: INALFA ROOF SYSTEMS GROUP B.V., Oostrum (NL)

(72) Inventors: Leonardus Augustus Perfors, Belfeld (NL); Eduardus Christianus Henricus van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/703,684

(22) Filed: Mar. 24, 2022

(65) Prior Publication Data

US 2022/0306211 A1    Sep. 29, 2022

(30) Foreign Application Priority Data

Mar. 26, 2021  (EP) .................................... 21165371

(51) Int. Cl.
  *B62D 25/07*  (2006.01)
  *B60R 13/02*  (2006.01)

(52) U.S. Cl.
  CPC .......... *B62D 25/07* (2013.01); *B60R 13/0231* (2013.01)

(58) Field of Classification Search
  CPC ...... B62D 25/06; B62D 25/07; B62D 25/022; B60J 7/0015; B60J 7/022; B60J 7/043; B60J 7/0435; B60J 7/05; B60J 7/053; B60J 7/028; B60J 7/04; B60J 7/042

USPC ......... 296/216.01, 216.06–216.09, 221–223, 296/210, 215

See application file for complete search history.

(56) References Cited

U.S. PATENT DOCUMENTS

| | | | |
|---|---|---|---|
| 7,731,275 | B2 | 6/2010 | Bergmiller et al. |
| 2009/0085382 | A1 | 4/2009 | Bergmiller et al. |

FOREIGN PATENT DOCUMENTS

| | | |
|---|---|---|
| EP | 1431092 A1 | 6/2004 |
| EP | 2042361 A2 | 4/2009 |

OTHER PUBLICATIONS

European Search Report in corresponding European application No. 21165371.2 dated Sep. 10, 2021.

*Primary Examiner* — Dennis H Pedder
(74) *Attorney, Agent, or Firm* — Steven M. Koehler; Westman, Champlin & Koehler, P.A.

(57) ABSTRACT

A vehicle roof assembly for covering at least a part of a passenger compartment of a vehicle comprises a mounting frame and a panel device. The panel device comprises a cover panel and a mounting bracket comprising a mounting flange. The mounting frame comprises a first flange and a second flange under an angle. The second flange comprises a mechanical coupler for attaching the mounting flange. The first flange is configured to be extending towards the passenger compartment. The mounting flange is attached to the second flange at the mechanical coupler. In a mounted state, at least a part of the first flange is arranged closer to the cover panel than the mechanical coupler such that head space is preserved.

10 Claims, 4 Drawing Sheets

VEHICLE ROOF ASSEMBLY

BACKGROUND

The discussion below is merely provided for general background information and is not intended to be used as an aid in determining the scope of the claimed subject matter.

The invention relates to a vehicle roof assembly and a vehicle comprising such roof assembly.

An open-roof assembly is well-known. The open-roof assembly is configured to be mounted in a vehicle roof and comprises at least one moveably arranged closure member. The closure member is configured and arranged to cover an opening in the vehicle roof or at least partly uncover the opening in the vehicle roof. Usually, but not necessarily, the closure member is a transparent panel and comprises glass or a suitable plastics. The closure member may be configured to tilt or to slide.

Further, it is known to provide a fixed, usually transparent panel in the vehicle roof of a passenger compartment to enable a sky view through the roof of the vehicle, for example, for any occupants in the passenger compartment.

Such a fixed roof panel may be mounted on a frame, which frame is mounted on a body of the vehicle. Further, a sun blind system, such as a rollo-blind, may be provided directly below the transparent panel to regulate an amount of sun light entering a passenger compartment of the vehicle.

A coupling between the frame and the roof panel may be provided such that a height level of the roof panel relative to the frame and thus relative to the vehicle body is adjustable in order to enable to mount the roof panel flush to an outer part of the body of the vehicle. Such adjustment is performed after mounting the vehicle roof assembly on the vehicle body. To adjust and fix the position of the roof panel, mechanical couplers like screws are provided such that the mechanical couplers are operable from the passenger compartment. To provide such accessibility to the mechanical couplers, other elements like the sunblind need to be configured and arranged suitably, which commonly includes at a distance from the roof panel, thereby decreasing head space for the occupants.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, a vehicle roof assembly comprises a mounting frame and a panel device. The panel device comprises a cover panel and at least one mounting bracket adhered to the cover panel. The mounting bracket comprises a mounting flange, the mounting flange extending substantially perpendicular to the cover panel. The mounting frame comprises a first flange and a second flange, the first flange extending under an angle relative to the second flange, wherein the second flange comprises a mechanical coupler configured to attach the mounting flange and the second flange comprising a first main surface and a second main surface, the second main surface being opposite to the first main surface. In a mounted state, i.e. when the mounting frame and the panel device are coupled, at least a part of the first flange is arranged at a level between a level of the cover panel and a level of the mechanical coupler; the first main surface of the second flange extends substantially parallel to the mounting flange and is configured to be directed towards the passenger compartment; the first flange extends parallel to a direction away from the first main surface of the second flange and is configured to be extending towards the passenger compartment; and the mounting flange is attached to the second flange at the mechanical coupler.

In the vehicle roof assembly, the panel device and the mounting frame are a functionally separate parts. The mounting frame is configured to be mounted on the vehicle body. In an embodiment, the mounting frame is configured to be mounted from within the passenger compartment side of the vehicle roof upward, wherein the mounting frame is then mounted to a body flange. The panel device may be mounted together with the mounting frame, while in the mounted state, or may be mounted later from the outside. In particular, for servicing, the panel device may be removed and remounted later.

As above mentioned, as used herein, the mounted state refers to a state wherein the panel device and the mounting frame are coupled in a manner as intended to be mounted in the vehicle roof. The term 'mounted state' as used herein does not require that the vehicle roof assembly is actually mounted in a vehicle roof, although that may be the case.

The cover panel may be the panel covering the passenger compartment and may usually be a transparent panel, although other embodiments are envisaged as well. For example, a lighting panel, a display panel, or even a partly removeable or moveably arranged panel may be used.

The mounting bracket may be attached to the cover panel in any suitable manner. As known in the art, the mounting bracket may be adhered using an adhesive or be embedded in an encapsulant layer that may be provided in a peripheral area adjacent to an edge of the cover panel. The methods of attaching the mounting bracket are well known in the art and are therefore not further elucidated herein.

The mounting bracket comprises a mounting flange that extends substantially perpendicularly. As the cover panel may be curved, the precise angle between the mounting flange and the cover panel is usually not exactly perpendicular. Essentially, the mounting flange extends in a direction towards the passenger compartment, when seen in a state mounted in a vehicle roof. When considering the cover panel as a planar object covering the passenger compartment, the mounting flange may be considered to extend substantially perpendicular to such planar object. It is noted that the mounting bracket, including the mounting flange, may be formed by a single element or by any other suitable number of mechanically coupled elements. Further, in an embodiment, one or more mounting brackets may be provided along each of at least two edges of the cover panel.

The second flange of the mounting frame comprises a first main surface and a second main surface, wherein the second main surface is opposite to the first main surface. When mounted in a vehicle roof, the first main surface is directed towards the passenger compartment. Further, in the mounted state, the mounting flange is arranged substantially parallel to the first and second main surface of the second flange. With the mechanical coupler of the second flange, the mounting flange is attached to the second flange, thereby supporting the panel device.

The first flange extends under an angle relative to the second flange. The first flange may be used for supporting or providing a guide rail for a sun blind, like a rollo-blind. Thereto, the first flange extends in a direction towards the passenger compartment, away from the first main surface. The angle may commonly be close to a right angle, but may essentially be any angle. It is noted that, in an embodiment, the first flange may protrude from the first main surface of the second flange or, in another embodiment, the second flange may protrude from the first flange or, in yet another embodiment, the first and second flange may be separate parts or elements, each mechanically or integrally coupled to any other suitable part of the mounting frame.

At least a part of the first flange is arranged at a level between a level of the cover panel and a level of the mechanical coupler. As used herein, a level refers to a position as seen in a direction perpendicular to the cover panel in the mounted state. Such direction may also be referred herein as a height direction, a Z-direction or a vertical direction. Please note that the term 'vertical direction' assumes that the vehicle roof assembly is mounted in a vehicle that is positioned on a substantially horizontal surface, as would be its common or normal orientation. If the vehicle or the vehicle roof assembly is not oriented in such normal orientation, the 'vertical direction' as used herein may not correspond to being vertical.

As mentioned above, the first flange may be provided to mount or provide a guide rail, or any other functional element, close to the cover panel. As at least a part of the first flange is arranged at a level between the level of the cover panel and the level of the mechanical coupler, the level of the guide rail or other functional element may indeed be positioned close to the cover panel, as no spacing is needed to enable access to the mechanical coupler. As a result, more head space is maintained.

In an embodiment of the vehicle roof assembly, the mounting frame comprises a frame element, wherein the first flange and the second flange are integral parts of the frame element. In a particular embodiment, the frame element is an extruded, elongated element, formed from aluminium or a suitable plastics, and the first and second flange are integrally formed therewith. Of course, in another embodiment, the mounting frame may comprises separate elements forming the first and the second flanges, which separate elements are later mechanically coupled, e.g. through screws, welding, riveting, application of an adhesive, or any other suitable method.

In an embodiment of the vehicle roof assembly, the first flange comprises a through hole and, in the mounted state, at least a part of the mounting flange extends through the through hole. Since the first flange is at least partly arranged at a level between the level of the cover panel and the level of the mechanical coupler, the through hole enables to arrange at least a part of the mounting flange next to the mechanical coupler for mounting.

In an embodiment of the vehicle roof assembly, in the mounted state, the mounting flange is attached to the second flange at a side of the first main surface. For example, a nut may be provided at the second main surface, while a through hole in the second flange and a through hole in the mounting flange enable to provide a bolt there through to attach the mounting flange to the second flange. The through hole through the mounting flange may be elongated to enable position adjustment, as well known in the art. Still, any other suitable mechanical coupler may be applied for attachment. In an embodiment, the mechanical coupler may be configured to enable a position adjustment in one or both directions parallel to the cover panel.

In an embodiment of the vehicle roof assembly, the mounting flange has a low stiffness in a direction perpendicular to a plane in which the mounting flange extends to allow the cover panel to move in such direction. For ease of mounting and positioning, the cover panel may be arranged to be moveable over a limited range in a direction parallel to the cover panel such that the cover panel may be positioned in such direction by abutment to an outer body part of the vehicle.

In an embodiment of the vehicle roof assembly, the mounting frame comprises a drain channel arranged at a side of the second main surface, wherein the drain channel is arranged at a level between the level of the cover panel and the level of the mechanical coupler. In a particular embodiment thereof, the drain channel is at least partly arranged next to a part of the mounting flange and, in the mounted state, the drain channel is distanced from the mounting flange to allow the mounting flange to bend. Such bending, as above described, may allow the cover panel to adapt to and abut the outer vehicle body.

In an embodiment of the vehicle roof assembly, the mounting frame comprises a drain channel arranged at a side of the second main surface, wherein the drain channel is arranged at a level overlapping the level of the mechanical coupler, wherein, at the level of the mechanical coupler, a mounting space between the second flange and the drain channel is provided. A side wall of the drain channel may, instead of being substantially parallel to the second flange and the mounting flange, be arranged slanted to provide sufficient space at the level of the mechanical coupler for mounting the mounting flange.

In an embodiment of the vehicle roof assembly, a protection flange is arranged at a side of the second main surface of the second flange such that the mechanical coupler are at least partially covered. If an airbag is arranged close to the mechanical coupler, the mechanical coupler protruding from the second main surface may puncture the airbag when deployed. The protection flange will protect the airbag and prevent puncture.

In an aspect, a vehicle comprising the vehicle roof assembly is provided. In the vehicle, a head liner is provided in the passenger compartment as well-known in the art. The head liner is configured and arranged to abut the first flange and to cover the mechanical coupler. Thus, the mechanical coupler and the mounting frame are suitably removed from visibility from the passenger compartment.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

DETAILED DESCRIPTION OF THE ILLUSTRATIVE EMBODIMENTS

Figure 1A:
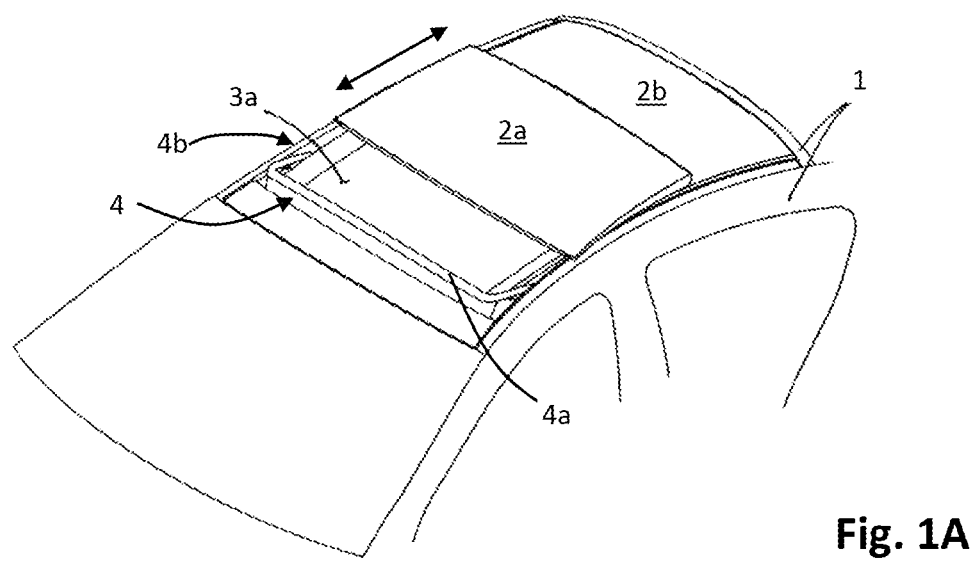
FIG. 1A shows a perspective view of a vehicle roof with an open roof assembly.

Aspects of the present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
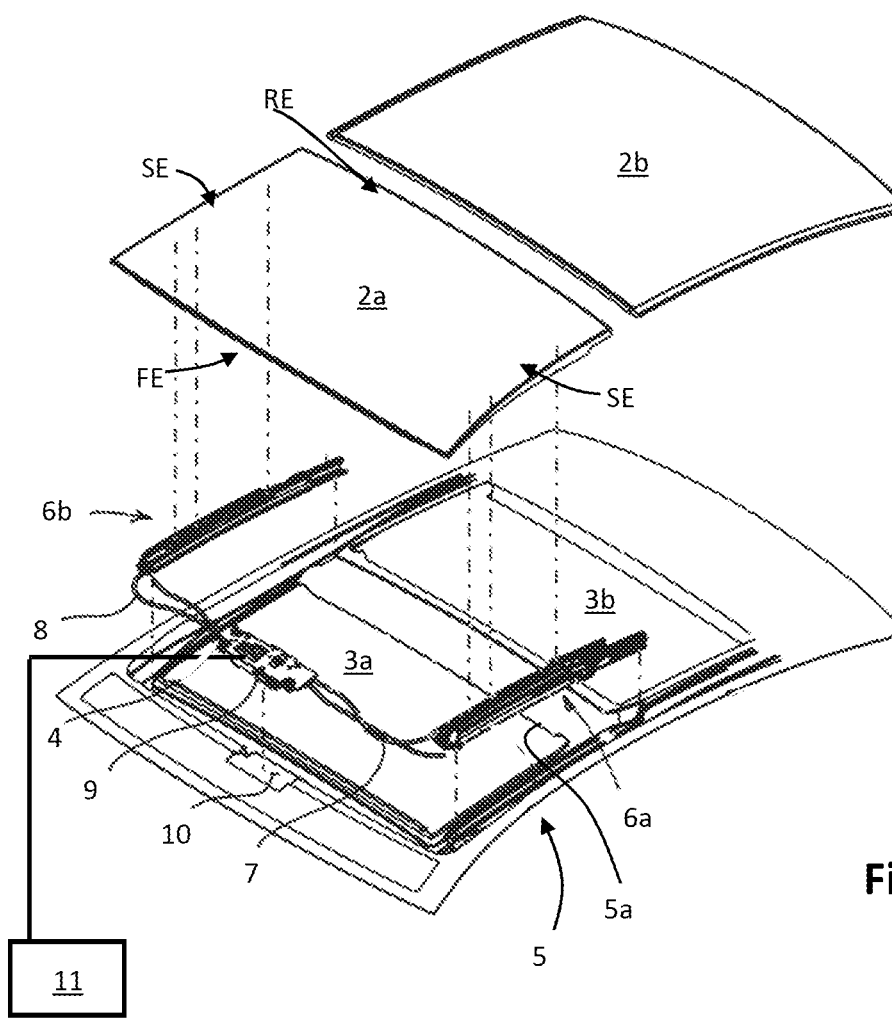
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

A control module 11 is schematically illustrated and is operatively coupled to the electric motor 9. The control module 11 may be any kind of processing module, either a software controlled processing module or a dedicated processing module, like an ASIC, which are both well known to those skilled in the art. The control module 11 may be a stand-alone control module or it may be operatively connected to another control module, like a multipurpose, generic vehicle control module. In yet another embodiment, the control module 11 may be embedded in or be part of such a generic vehicle control module. Essentially, the control module 11 may be embodied by any control module suitable for, capable of and configured for performing operation of the electric motor 9 and thus the moveable roof assembly.

Figure 2A:
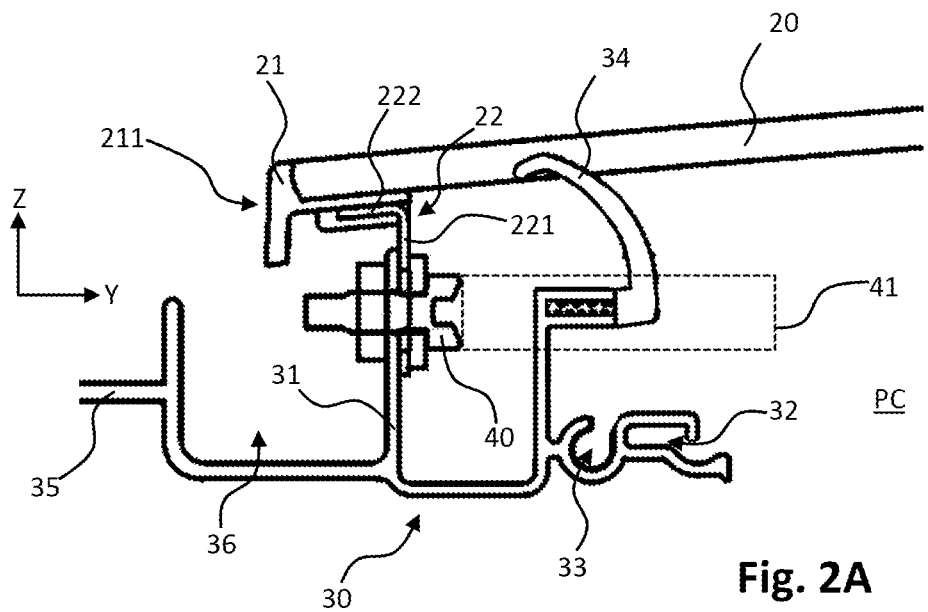
FIG. 2A shows a cross-section of a prior art embodiment of a vehicle roof assembly.

FIG. 2A shows a prior art vehicle roof assembly comprising a cover panel 20, herein also referred to as a closure member, and an edge encapsulation 21 as well-known in the art. A mounting bracket 22 comprises a panel attachment flange 222 and a mounting flange 221. The panel attachment flange 222 is adhered to the cover panel 20 through the edge encapsulation 21 and the mounting flange 221 extends substantially perpendicular to the cover panel 20 in the direction of a passenger compartment PC.

A mounting frame 30 comprises a second flange 31, arranged in parallel to the mounting flange 221, a sunblind-cloth guiding channel 32 and a drive cable channel 33 for holding a driven cable for moving a pull beam of a sunblind cloth. Such a sunblind system, also commonly known as a rollo blind system, is well known in the art and is not further elucidated herein.

A cover seal 34 is attached to the mounting frame 30 for hiding a mechanical coupler 40 from view. In the illustrated embodiment, the mechanical coupler 40 comprises a bolt, but any other releasable mechanical coupler may be employed as well. For operating the mechanical coupler, i.e. for mounting or dismounting of the panel device comprising the cover panel 20, the encapsulation 21 and the mounting bracket 22, a through hole or recess needs to be provided locally in the mounting frame 30. For operating the bolt 40, a tool needs access to the bolt 40 through space 41. Moreover, the sunblind-cloth guiding channel 32 and the drive cable channel 33 are positioned further away from the cover panel 20 in order to provide sufficient access to the mechanical coupler 40.

The mounting frame 30 further comprises a drain channel 36. The drain channel 36 is provided to remove water, other liquids and dirt that may come over the edge encapsulation 21. An outer body shell of the vehicle is arranged against an abutment surface 211 of the edge encapsulation 21, usually using a body seal. A minor amount of rain and other water and liquids, taking dirt with it, will flow between the body seal and the abutment surface 211 of the edge encapsulation 21. Such minor amount of liquid is received in the drain channel 36 and removed through a suitable channel or tube, as well known in the art.

The mounting frame 30 further comprises a body attachment flange 35, which is used to adhere the mounting frame 30 to the body of the vehicle, usually by application of a suitable adhesive, simultaneously providing water tightness.

Figure 2B:
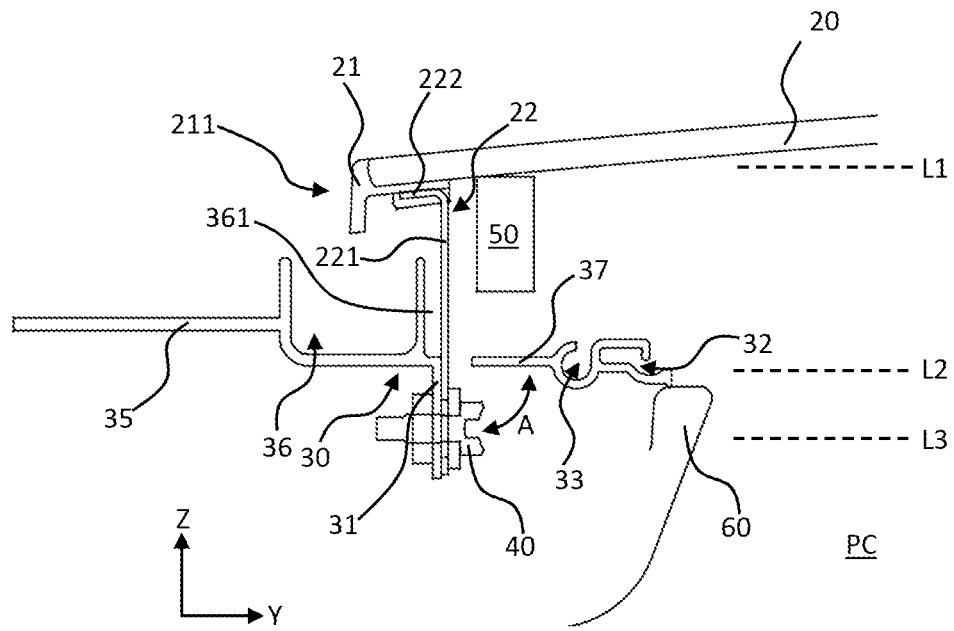
FIG. 2B shows a cross-section of a first embodiment of a vehicle roof assembly.

FIG. 2B shows a first embodiment of a vehicle roof assembly in a mounted state and in which the mechanical coupler 40 are arranged further away from the cover panel 20 and the sunblind-cloth guiding channel 32 and the drive cable channel 33 are arranged closer to the cover panel 20, in particular closer to the cover panel 20 than the mechanical coupler 40. The cover panel 20 is arranged at a first level L1, the sunblind-cloth guiding channel 32 and the drive cable channel 33 are arranged at a second level L2 and the mechanical coupler 40 are arranged at a third level L3. As apparent from FIG. 2B, the second level L2 is closer to the first level L1 than the third level L3. In other words, the second level L2 is arranged between the first level L1 and the third level L3.

In more detail, the sunblind-cloth guiding channel 32 and the drive cable channel 33 are an integral part of a first flange 37 of the mechanical coupler 40. As apparent to those skilled in the art, the sunblind-cloth guiding channel 32 and the drive cable channel 33 do not need to be an integral part, but may be a separate part mounted on the first flange 37.

The mounting flange 221 extends through the first flange 37, which is described in more detail herein in relation to FIGS. 3A-3B and 4A-4B. The mounting flange 221 is attached to the second flange 31 by the mechanical coupler 40. Again, as above mentioned, the mechanical coupler 40 are illustrated as a nut and bolt, but may comprise any other suitable releasable attachment means or configuration such as clips, plugs, etc. It is however preferred to enable a position shift in the Z-direction (see arrows indicating Y- and Z-directions in FIG. 2B) for arranging the cover panel 20 and edge encapsulation 21 flush with the outer body shell (not shown).

The drain channel 36 is designed with separate walls extending in the Z-direction preventing leakage between the second flange 31 and the mounting flange 221. Moreover, the drain channel 36 is distanced by a space 361 from the mounting flange 221 to allow the mounting flange 221 to bend in the Y-direction such to allow the cover panel 20 to adapt to the position of the outer body shell without generating an excessive force on the mounting frame 30.

In the illustrated embodiment, a lighting device 50 is provided on an inner surface of the cover panel 20 for providing ambient lighting in the passenger compartment PC. Any other functional element may be provided as well, as apparent to those skilled in the art. Further, such a functional element may be mounted alternatively on the first flange 37 or on the mounting flange 221.

Note that due to the position of the mechanical coupler 40, a cover seal 34 (FIG. 2A) may be omitted. The mounting flange 221 may be suitably manufactured to provide an aesthetically pleasing surface. No further covering is needed.

After mounting the vehicle roof assembly in the vehicle body, the mechanical coupler 40 are hidden from view by a head liner 60, which is a common part in a passenger compartment and is therefore not further described herein.

In a particular embodiment, if the lighting device 50 would be omitted, the sunblind-cloth guiding channel 32 and the drive cable channel 33 may be positioned even closer to the cover panel 20. Thereto, the first flange 37 may be mounted on the mounting frame 30 closer to the cover panel 20 or the first flange 37 may be arranged slanted upwards, for example. Hence, an angle A between the first flange 37 and the second flange 31 may be a substantially right angle as shown or may be any other suitable angle.

Figure 3A:
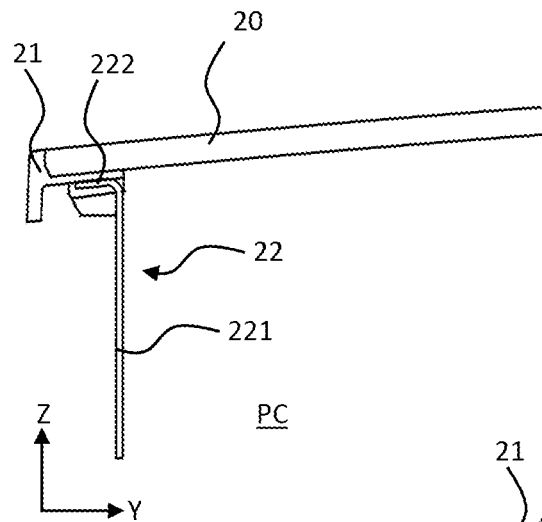
FIG. 3A shows a cross-section of an embodiment of a panel device.
Figure 3B:
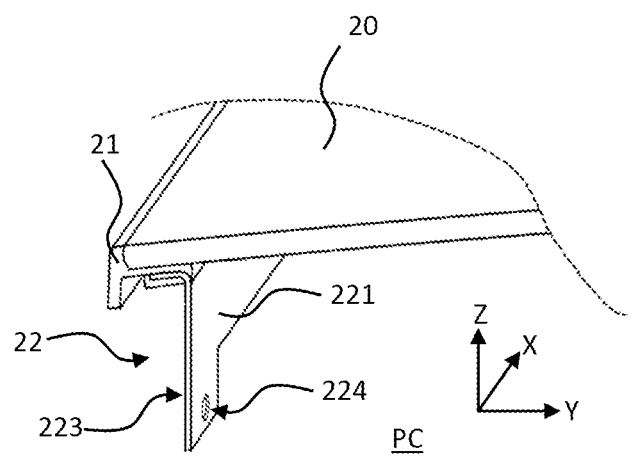
FIG. 3B shows a perspective view of the embodiment of a panel device of FIG. 3A in cross-section.
Figure 4A:
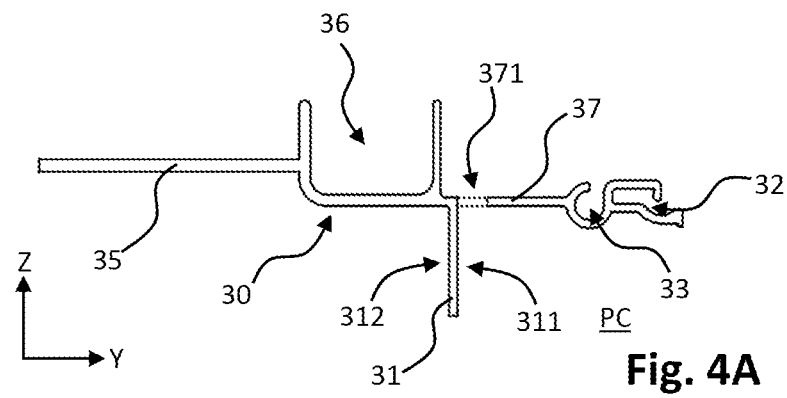
FIG. 4A shows a cross-section of an embodiment of a mounting frame.
Figure 4B:
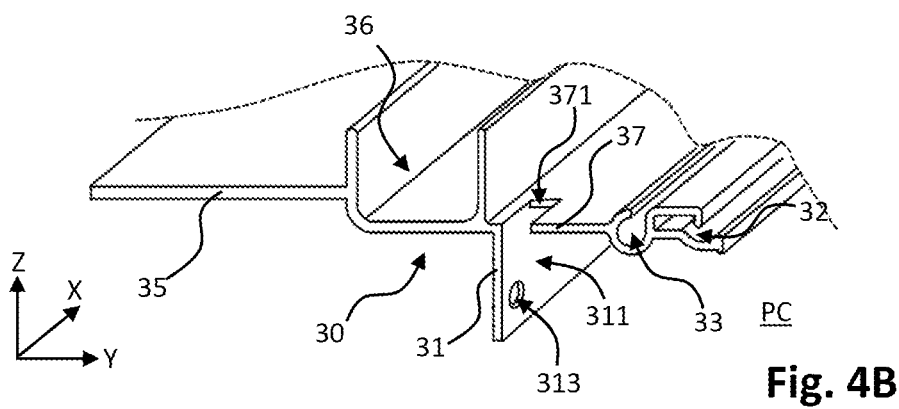
FIG. 4B shows a perspective view of the embodiment of a mounting frame of FIG. 4A in cross-section.

FIGS. 3A, 3B, 4A and 4B illustrate the first embodiment of FIG. 2B in an unmounted state in more detail. FIGS. 3A and 3B show the panel device comprising the cover panel 20, the edge encapsulation 21 and the mounting bracket 22. As illustrated in FIG. 3B, the mounting flange 221 comprises an extending part 223 and a mounting hole 224 extending through the mounting flange 221. FIGS. 4A and 4B illustrate the mounting frame 30. The first flange 37 is provided with a through hole 371 for receiving therethrough the extending part 223 of the mounting flange 221.

The second flange 31 comprises a first main surface 311 and a second main surface 312 opposite to the first main surface 311. A mechanical coupler 313 is formed in part as a through hole, which may (or may not) be threaded. If the through hole 313 is threaded, a bolt may be easily screwed and secured therein, otherwise a nut may be used. Such a nut may be freely supplied or may be attached to the second main surface 312 by welding, application of adhesive, or the like.

In the mounted state as illustrated in FIG. 2B, the mounting flange 221 is arranged at the first main surface 311 of the second flange 31. In another embodiment, the mounting flange 221 may be arranged at the second main surface 312, in which case the mechanical coupler 40 may be adapted to such arrangement in order to provide ease of mounting.

It is apparent to those skilled in the art that the through hole 371 in the first flange 37 may be provided at the end of the mounting frame 30 as a recess. Further, multiple through holes 371 may be provided along the length (X-direction) of the mounting frame 30. In such embodiment, the mounting flange 221 may be provided with multiple extended parts 223 at positions corresponding to the positions of the through holes 371.

Figure 5:
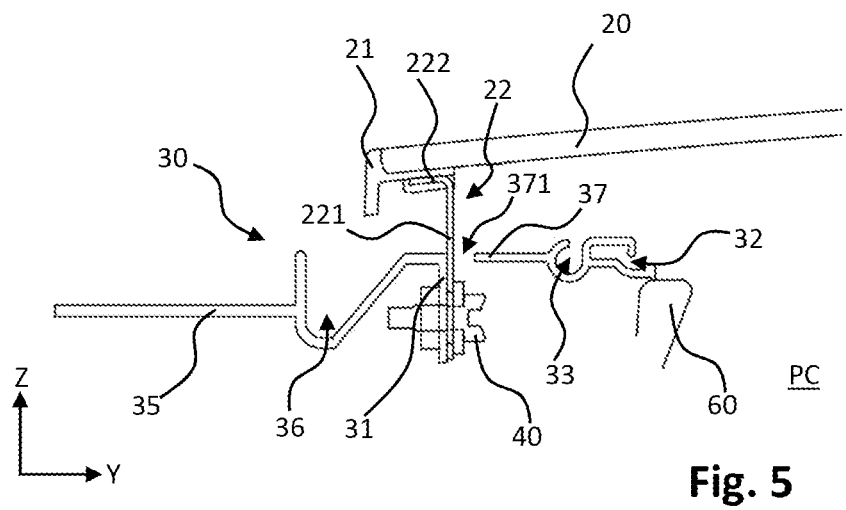
FIG. 5 shows a cross-section of a second embodiment of a vehicle roof assembly.

FIG. 5 illustrates a second embodiment, in which the lighting device 50 (FIG. 2B) is omitted. Due to the absence of such a functional element, the sunblind-cloth guiding channel 32 and the drive cable channel 33 may be arranged closer to the cover panel 20 as above mentioned. In this second embodiment, the first flange 37 is positioned closer to the cover panel 20. Due to such position, the mechanical coupler 40 could be positioned closer to the cover panel 20 as well.

As known from the prior art (FIG. 2A), the mechanical coupler 40 could extend into the drain channel 36. However, to ensure water tightness and/or for ease of mounting, in this second embodiment, the drain channel 36 is provided with an adapted cross-sectional shape. Thus, the length of the mounting flange 221 (i.e. its dimension in Z-direction) is reduced, thereby providing even further improved head space in the passenger compartment PC.

Figure 6:
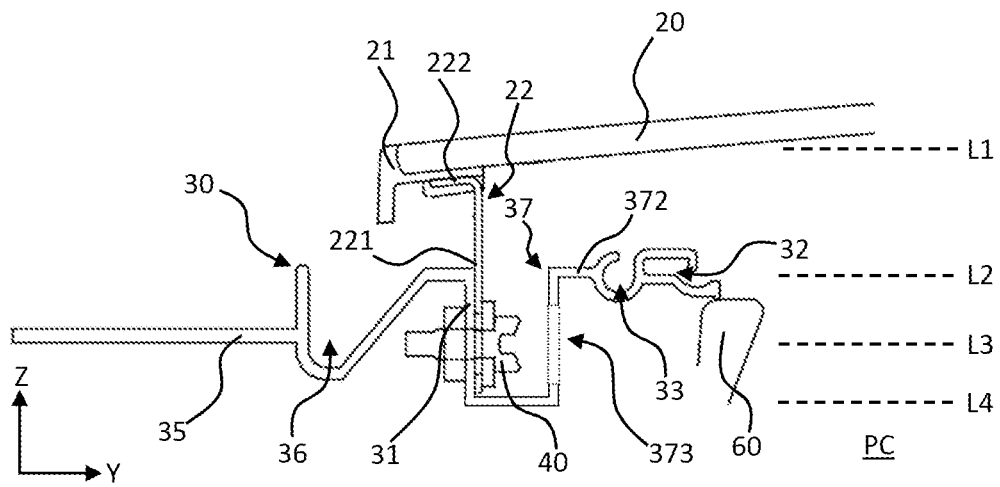
FIG. 6 shows a cross-section of a third embodiment of a vehicle roof assembly.

In the third embodiment of FIG. 6, the first flange 37 is embodied differently compared to the second embodiment, while providing a same result in respect to positioning of the sunblind-cloth guiding channel 32 and the drive cable channel 33 relative to the cover panel 20 and the mechanical coupler 40.

In the third embodiment, the first flange 37 is connected to the second flange 31 at a fourth level L4. The fourth level L4 is further away from the first level L1 of the cover panel 20 than the third level L3 of the mechanical coupler 40. An end section 372 of the first flange 37 is however at the second level L2, which is closer to the first level L1 of the cover panel 20 than the third level L3 of the mechanical coupler 40. In order to provide accessibility to the mechanical coupler 40, an access hole 373 is provided in the first flange 37 locally. Thus, also in this third embodiment, the head liner 60 covers the mechanical coupler 40 and the sunblind-cloth guiding channel 32 and the drive cable channel 33 are closer to the cover panel 20 as compared to the prior art embodiment of FIG. 2A.

The mechanical coupler 40 are illustrated herein as a single, integral element, e.g. an extruded element. As apparent to those skilled in the art, the same may be achieved by using multiple parts coupled to each other.

Figure 7:
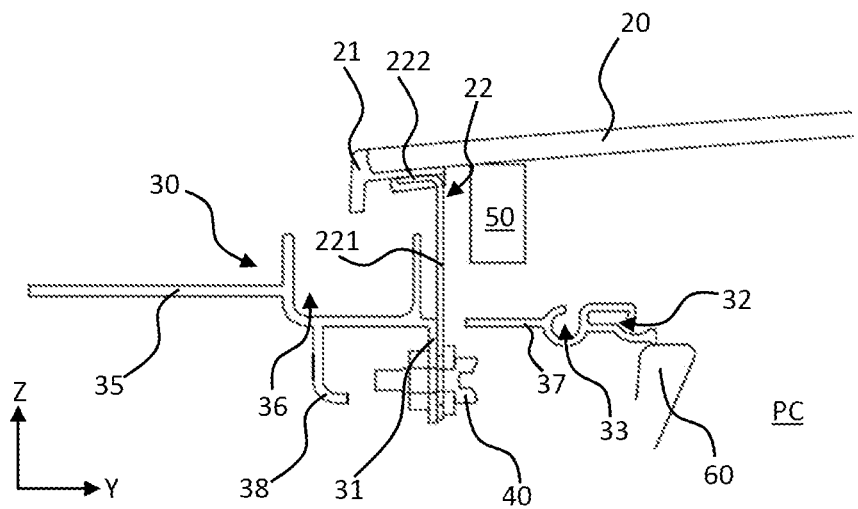
FIG. 7 shows a cross-section of a fourth embodiment of a vehicle roof assembly.

FIG. 7 illustrates fourth embodiment, which is comparable to the first embodiment of FIG. 2B except for a protection flange 38. In the vehicle roof, one or more airbags may be provided. Due to the position of the mechanical coupler 40, upon release of an airbag and depending on the position of the airbag and the mechanical coupler 40, the airbag may be punctured by the mechanical coupler 40. To prevent such puncture, the protection flange 38 may be provided covering at least partly the mechanical coupler at the side of the second main surface 312.

It is apparent to those skilled in the art that the illustrated embodiment of the protection flange 38 is merely an exemplary embodiment and many other shapes and positions are contemplated and apparent such that the function of protecting an airbag against puncture will be achieved.

As used herein, mechanical coupler comprises all elements directly contributing to establishing a mechanical coupling between elements. Hence, the mounting flange comprising a mechanical coupler may encompass that the mounting flange is provided with a through hole for receiving a bolt therethrough or may encompass other components. Further, a separate bolt is also considered and described as a mechanical coupler, albeit not necessarily as a part of the mounting flange. Thus, it is stipulated that more than one mechanical coupler may be present in the mounted state.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

The invention claimed is:

1. A vehicle roof assembly for covering at least a part of a passenger compartment of a vehicle, the vehicle roof assembly comprising a mounting frame and a panel device, the panel device comprising a cover panel and at least one mounting bracket adhered to the cover panel, wherein the mounting bracket comprises a mounting flange, the mounting flange extending substantially perpendicular to the cover panel; and the mounting frame comprising a first flange configured to support a functional element and a second flange, the first flange extending in a non-parallel manner with respect to the second flange, wherein the second flange comprises a mechanical coupler configured to attach the mounting flange, and the second flange comprising a first main surface and a second main surface, the second main surface being opposite to the first main surface;

wherein, in a mounted state, at least a part of the first flange and the functional element are arranged at a level between a level of the cover panel and a level of the mechanical coupler and inwardly of the coupler;

the first main surface of the second flange extends substantially parallel to the mounting flange and is configured to be directed towards the passenger compartment;

the first flange extends parallel to a direction away from the first main surface of the second flange and is configured to be extending towards the passenger compartment; and the mounting flange is attached to the second flange at the mechanical coupler.

2. The vehicle roof assembly according to claim 1, wherein the mounting frame comprises a frame element, the first flange and the second flange being integral parts of the frame element.

3. The vehicle roof assembly according to claim 1, wherein the first flange comprises a through hole and wherein, in the mounted state, at least a part of the mounting flange extends through the through hole.

4. The vehicle roof assembly according to claim 1, wherein, in the mounted state, the mounting flange is attached to the second flange at a side of the first main surface.

5. The vehicle roof assembly according to claim 1, wherein the mounting frame comprises a drain channel arranged at a side of the second main surface, wherein the drain channel is arranged at a level between the level of the cover panel and the level of the mechanical coupler.

6. The vehicle roof assembly according to claim 5, wherein the drain channel is at least partly arranged next to a part of the mounting flange and wherein, in the mounted state, the drain channel is distanced from the mounting flange to allow the mounting flange to bend.

7. The vehicle roof assembly according to claim 1, wherein the mounting frame comprises a drain channel arranged at a side of the second main surface, wherein the drain channel is arranged at a level overlapping the level of the mechanical coupler, wherein, at the level of the mechanical coupler, a mounting space between the second flange and the drain channel is provided.

8. A vehicle comprising the vehicle roof assembly according to claim 1, wherein a protection flange is arranged at a side of the second main surface of the second flange such that the mechanical coupler are at least partially covered.

9. A vehicle comprising the vehicle roof assembly according to claim 1, wherein a head liner is provided in the passenger compartment, the head liner being configured and arranged to abut the first flange and to cover the mechanical coupler.

10. The vehicle roof assembly according to claim 1, wherein the functional element comprises a guide rail.

* * * * *